United States Patent [19]

Norcross

[11] Patent Number: 5,039,404
[45] Date of Patent: Aug. 13, 1991

[54] OXYGEN PERMEABLE MEMBRANE USED IN WASTEWATER TREATMENT

[75] Inventor: Kenneth L. Norcross, Shawnee Mission, Kans.

[73] Assignee: JMO Holding, Inc., Industrial Airport, Kans.

[21] Appl. No.: 518,667

[22] Filed: May 3, 1990

[51] Int. Cl.$^5$ ............................ C02F 1/74; B01F 5/02
[52] U.S. Cl. ..................................... 210/151; 210/200
[58] Field of Search ............... 210/604, 605, 614, 616, 210/151, 172, 147, 200

[56] References Cited

U.S. PATENT DOCUMENTS

| | | | |
|---|---|---|---|
| 3,562,137 | 2/1971 | Gehring | 204/258 |
| 4,142,966 | 3/1979 | Perry | 210/22 R |
| 4,246,099 | 1/1981 | Gould et al. | 210/603 |
| 4,505,820 | 3/1985 | Eertink | 210/604 |
| 4,566,971 | 1/1986 | Reimann et al. | 210/616 |
| 4,645,592 | 2/1987 | Calltharp et al. | 210/142 |
| 4,649,114 | 3/1987 | Miltenburger et al. | 435/240 |
| 4,663,050 | 5/1987 | Li et al. | 210/649 |
| 4,775,467 | 10/1988 | Calltharp et al. | 210/142 |
| 4,956,093 | 9/1990 | Pirbazari et al. | 210/616 |

Primary Examiner—Frank Spear
Attorney, Agent, or Firm—Litman, McMahon & Brown

[57] ABSTRACT

An apparatus for use in the biological treatment of contaminated water with activated sludge utilizing a sequencing batch reactor process, fixed film media reactor or the like and, in particular, for supplying oxygen rich gas to the proces. Air is located on one side of an oxygen permeable membrane under a differential pressure urging oxygen in the air to pass through the membrane for separating the oxygen from nitrogen in the air. The oxygen downstream of the membrane is conveyed by a gas line leading to a circulation manifold located in the reactor. Jet nozzles on the circulation manifold communicate with oxygen in the gas line. When activated sludge and wastewater are pumped into the circulation manifold and forced through the jet nozzles, a vacuum is created therein drawing the oxygen rich gas from the membrane into the nozzles and pumping the resulting liquid/gas mixture into the reactor, mixing the oxygen with the wastewater.

13 Claims, 2 Drawing Sheets

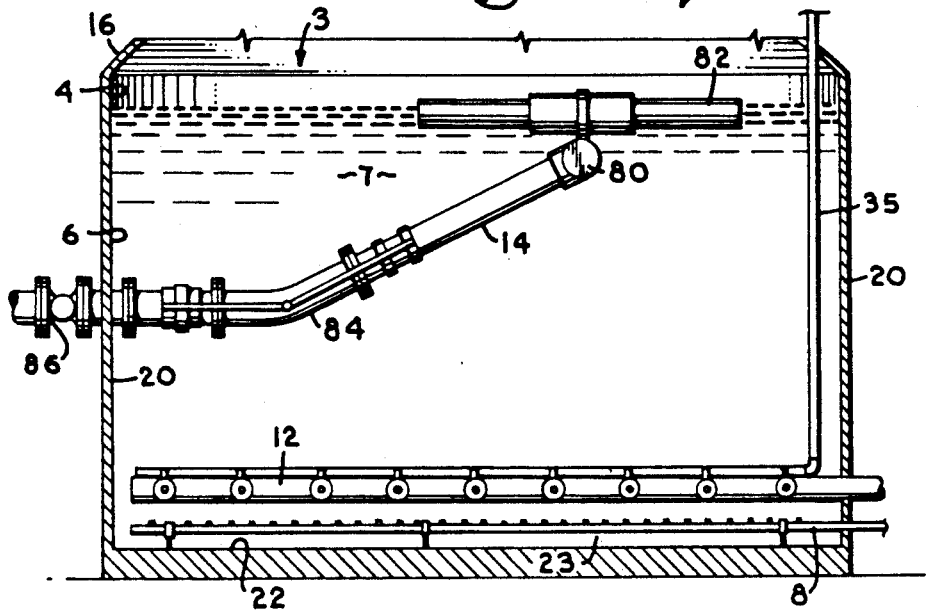
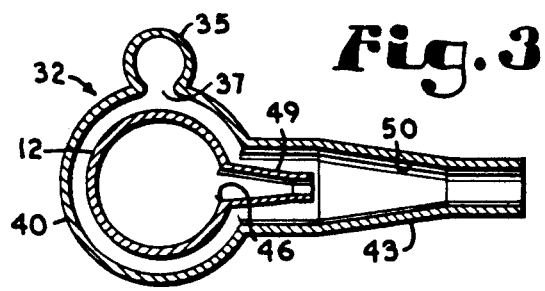
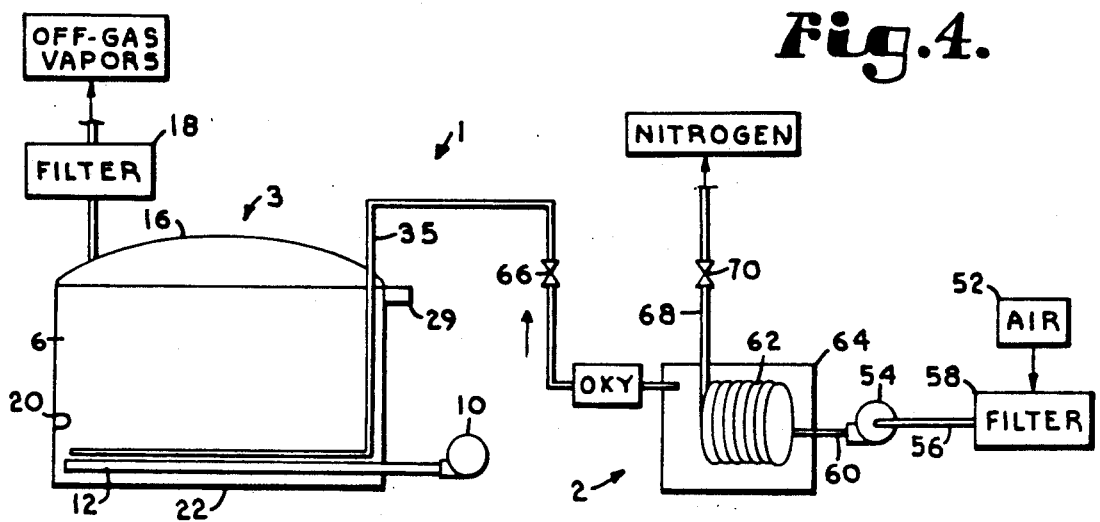

OXYGEN PERMEABLE MEMBRANE USED IN WASTEWATER TREATMENT

BACKGROUND OF THE INVENTION

The present invention relates to processing equipment for the treatment of sewage wastewater or other contaminated water with microorganisms to remove impurities and in particular, to processes of this type utilizing jet aeration for wastewater reaction and mixing and including an oxygen permeable membrane in an air line leading to the jet aeration apparatus so as to supply a relatively highly concentrated oxygen gas stream to the reactor.

Oxygen is an essential component in any activated sludge or fixed film process for the treatment of wastewater. Microorganisms in such processes require oxygen to sustain their metabolic function allowing them to multiply and so as to consume and digest contamination in the water as food.

Most wastewater treatment facilities treat large amounts of wastewater each day, therefore, large quantities of oxygen are also required. For example, in a sequencing batch reactor process having two reactor basins that is designed to treat one million gallons of water each day, the oxygen requirement may be on the order of 4,000 pounds per day. Typically, oxygen is supplied to the wastewater treatment process by bubbling air through the wastewater so that the oxygen interacts with the sludge or film. When air is used to supply the oxygen, the total gas amount pumped into the reactors may exceed 20,000 pounds per day as some oxygen is lost and because oxygen is only a partial component of air. In particular, air contains approximately twenty-three percent (23%) oxygen by weight with most of the remainder being nitrogen. As some of the oxygen and relatively little of the nitrogen do not completely dissolve in the water in conventional processes, relatively large quantities of undissolved gas escape from the top of the wastewater.

Nitrogen is an inert gas, only slightly soluble in water and has, therefore, been considered relatively unimportant in the treatment of wastewater. However, when air is used as the oxidant in a treatment process, the large quantity of nitrogen vented into the atmosphere results in substantial heat loss from the reactor. Heat loss from the processing wastewater due to warming of the nitrogen/oxygen off-gas and to wastewater evaporation into the off-gas is undesirable because aerobic digestion normally progress more efficiently at warmer temperatures.

A major disadvantage of using air as the oxidant in an activated sludge treatment process, fixed film process, or the like is that wastewater suspended in the nitrogen/oxygen off-gas forms aerosols that, along with any volatiles escaping with the off-gas, may carry toxic or hazardous substances from the wastewater that either pollute the surrounding air or must be scrubbed, filtered or otherwise removed from the off-gas stream before venting. The added volume of the off-gas, due especially to the nitrogen present when air is used, at best substantially increases the size of piping and other processing equipment and operational costs as compared to what would be required if air were not used as a source for the oxygen.

When air is replaced by an oxygen rich gas in the wastewater treatment process, heat loss can be greatly diminished resulting in a more efficient treatment process that can be maintained at a relatively higher temperature without the addition of external heat. The total volume of gas bubbling through the wastewater is also lessened, resulting in a smaller volume of hazardous gas emission requiring smaller off-gas piping and equipment, smaller gas filtration equipment and reduced scrubbing costs.

In a sequencing batch reactor (SBR) process, replacement of air by oxygen rich gas is particularly beneficial. An SBR usually includes two or more batch reactor basins containing activated sludge. A specific volume of wastewater enters a basin during a "fill" cycle. Upon completion of a fill cycle, a "react" cycle normally begins wherein the wastewater is mixed with the activated sludge and aerated. Following the react cycle, the liquid in the basin is allowed to settle and then the treated wastewater is decanted.

Ideally, the fill cycle is anoxic, or without aeration so that the oxygen demand in the basin is high, producing a large oxygen driving gradient when aeration begins during the react cycle, resulting in a more efficient process.

Although the conventional use of air to provide oxygen has created a number of problems that are now increasing with air pollution concerns, air pumped directly into the reactor has remained the normal source of oxygen in wastewater treatment because of problems associated with producing oxygen rich gas and/or transporting the gas to the wastewater.

Prior art attempts have been made to eliminate the use of air while providing a generally "purified" supply of oxygen. Such prior art attempts have included use of bottled or cryogenic oxygen, molecular sieves and the placement of an oxygen separation membrane directly in the wastewater. However, bottled and cryogenic oxygen are relatively expensive substantially adding to the operating costs of such processes. The other prior art methods have been relatively inefficient. This has been especially true of the previous use of an oxygen permeable membrane that was placed directly in the wastewater reactor.

In particular, when the oxygen permeable membrane is placed at the interface between the air and the wastewater in a reactor basin, it is difficult to maintain the suitable operation membrane in a reactor filled with wastewater. That is, the membrane quickly becomes covered with slime and becomes clogged. Therefore, a reactor using such a membrane must include access to equipment to allow for frequent cleaning, resulting in increased reactor, equipment and maintenence costs and substantial downtime.

The prior art has most likely attempted to resolve the oxygen concentration problem by placement of the membrane directly in the wastewater to avoid the explosive hazard that potentially exists in the pumping or compressing of relatively highly concentrated oxygen. Consequently, pumps or compressors have been maintained upstream of the membrane and the membrane has been placed directly in the wastewater.

SUMMARY OF THE INVENTION

An apparatus is provided for supplying highly concentrated oxygen rich gas to an activated sludge or fixed film wastewater or contaminated water treatment process. For example, the process may be utilized in a wastewater treatment facility having a multi-basin sequencing batch reactor (SBR). An oxygen permeable membrane spaced from liquid located in the reactor is flow positioned in a gas line leading to the SBR. A wastewater circulation mechanism in each basin of the SBR cooperates with the membrane through the gas line. Pumping means, such as compressor or pump upstream of the compressor or the like, provide a pressure gradient across the membrane so as to urge oxygen rich gas through the oxygen permeable membrane and into the circulation mechanism, preferably without a potentially spark producing device within the gas line with the highly concentrated oxygen. In certain embodiments, an eductor system or the like may be utilized on the oxygen rich side of the membrane to draw oxygen through the membrane.

A wastewater treatment system, as described herein, normally includes two or more reactor basins adapted to hold wastewater. Each basin typically includes a piping system having a wastewater inlet and distribution manifold located near the bottom of the basin. The distribution manifold includes a plurality of distribution aperatures through which the wastewater to be treated initially enters the basin. For such a system, the distribution manifold is typically flow connected to a pump and a circulation/aeration conduit located above the distribution manifold. The conduit also typically includes a plurality of mixer/aerators, such as a series of distribution aperatures having jet nozzles attached thereto. Once the basin is filled with wastewater, the pump draws wastewater from the distribution manifold and discharges the water out of the jet nozzles of the circulation/aeration conduit, mixing the wastewater exiting the nozzles with the remaining wastewater and especially mixing the microorganisms in the basin throughout the reactor.

An oxygen supply line connected to a source of relatively high oxygen concentration gas (as used herein relatively high oxygen concentration means above the normal concentration of air, preferably approaching 100% oxygen) communicates with each of the jet nozzles associated with the circulation/aeration conduit. Each of the jet nozzles preferably include a high velocity zone located within the nozzle for the flow of water therethrough whereupon the water is mixed with the oxygen rich gas and the outlet for the combined exit of oxygen and liquid mixed together from the nozzle. Preferably, each of the mixer/aerators operably functions as a venturi to provide an eductor such that the passage of the wastewater discharged from the inner outlet through the remainder of the nozzle tends to create a vacuum that draws the oxygen rich gas from the oxygen supply line, thereby increasing the pressure gradient between the nozzle and the air side of the membrane. In addition, the highly turbulent flow in the nozzle tends to provide relatively good mixing between the oxygen in the gas and wastewater so that there is a greater likelihood that the oxygen will be absorbed in wastewater or be readily available to the bacteria rather than simply bubble to the top of the reactor and be lost as off-gas.

The oxygen permeable membrane is preferably contained in a negative and positive pressure containment enclosure located between the air source and the circulation/aeration conduit. A pressure relief control valve connected to the vacuum containment enclosure upstream of the membrane allows for release of nitrogen therefrom while maintaining a back pressure on the membrane. Pressurization means, such as a pump located upstream from the membrane, provides back pressure on the air side of the membrane.

OBJECTS OF THE INVENTION

Therefore, the objects of the present invention are: to provide a wastewater treatment apparatus adaptable to safely utilize a highly concentrated oxygen rich gas in the treatment process; to provide such an apparatus that maximizes aerobic process efficiency; to provide such an apparatus that minimizes reactor off-gas and especially substantially reduces the quantity of nitrogen in the off-gas; to provide such an apparatus that minimizes heat loss from the process in reactor off-gas; to provide such an apparatus that includes an oxygen permeable membrane for substantially separating oxygen from an air stream, especially nitrogen, at a location spaced from the wastewater thereby reducing maintenance related to cleaning the membrane; to provide such an apparatus wherein the oxygen rich gas is not pumped by a compressor that could cause a spark or explosion between the membrane and the wastewater reactor; to provide such an apparatus wherein oxygen rich gas is drawn from the membrane and urged into the wastewater by a circulation system located in a reactor basin; to provide such an apparatus wherein an air compressor upstream of the membrane functions in cooperation with a negative pressure produced by wastewater flowing through an eductor mixer so as to provide a sufficient pressure gradient to urge oxygen through the membrane into the wastewater while simultaneously mixing oxygen with wastewater so as to improve availability of oxygen to bacteria in the reactor and reduce oxygen bubbling as well as off-gas from the reactor; to provide such an apparatus that minimizes hazardous off-gas from the wastewater treatment process, thereby minimizing scrubbing equipment; to provide such an apparatus that requires few man hours to maintain; to provide such an apparatus that requires minimal access into the reactor basin; and to provide an apparatus and method of utilization that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a fragmentary, partially schematic cross-sectional view of one of the sequencing batch reactor basins, taken along line 2—2 of FIG. 1.

FIG. 3 is an enlarged, fragmentary cross-sectional view of the apparatus showing a jet aerator, taken along line 3—3 of FIG. 1.

FIG. 4 is a simplified schematic view on a reduced scale of the apparatus according to the present invention.

DETAILED DESCRIPTION OF THE INVENTION

Figure 1:
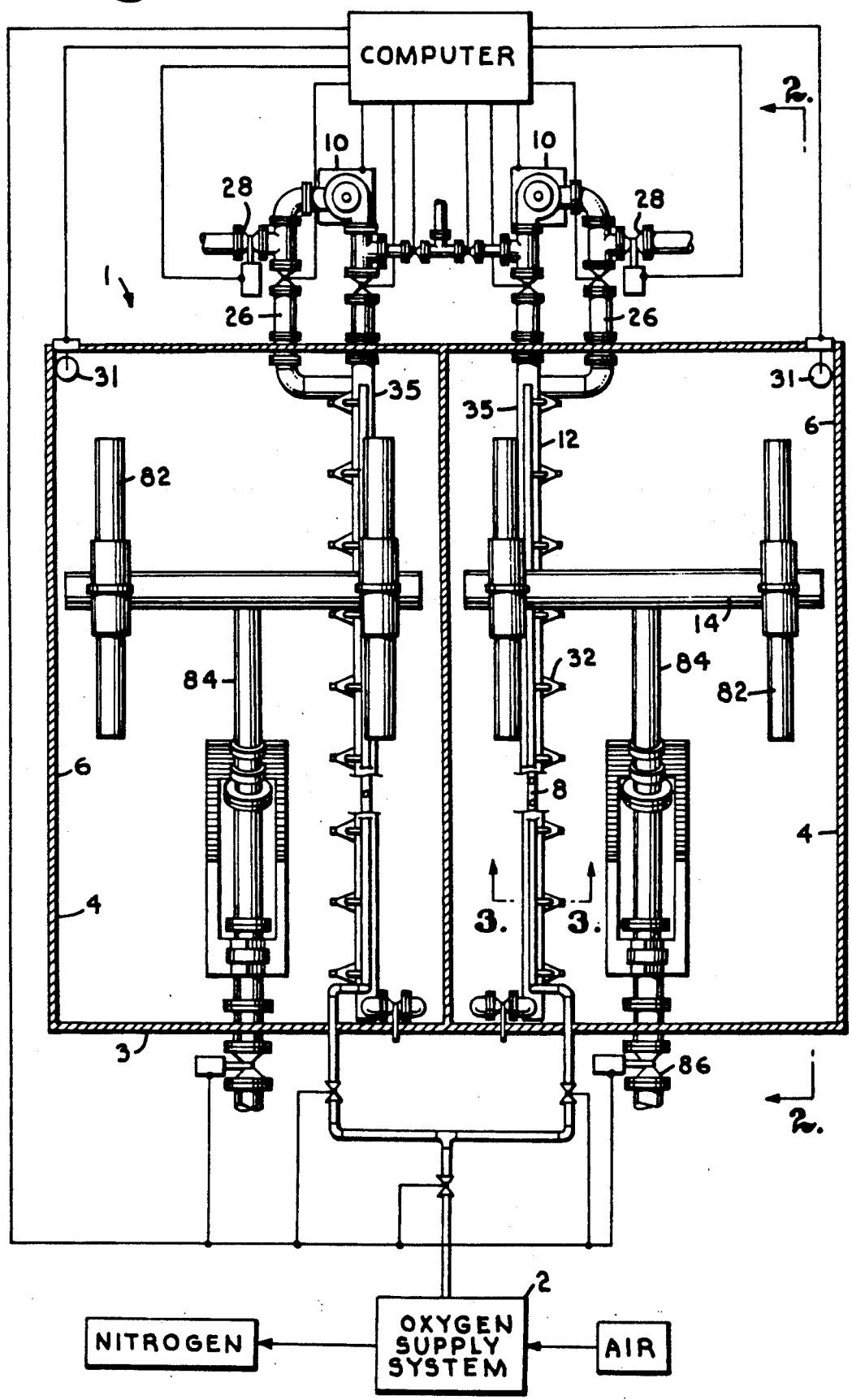
FIG. 1 is a fragmentary and partially schematic top plan view of a pair of sequencing batch reactor basins of an SBR apparatus according to the present invention wherein each basin is equipped with jet aerator/wastewater circulation equipment and decanter apparatus.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a sequencing batch reactor apparatus having an oxygen supply system 2 according to the present invention. The apparatus 1 includes a pair of sequencing batch reactors (SBR) 3 each having a reactor basin 4 and is illustrated partially schematically in FIG. 1. Reactor basins 4 are generally identical with the exception of being mirror images thereof. Each reactor 3 includes a respective basin 4 including a fluid containing tank, vessel or reservoir 6 for the containment of wastewater 7 to be processed, an influent manifold 8, pumping means such as recirculation pump 10 with an associated jet aeration/circulation conduit 12, decanting means such as floating effluent decanter 14, a roof 16, and filtering and scrubbing means, such as illustrated filter 18, for the treatment and/or removal of hazardous off-gases from the wastewater treatment process. Although an SBR is utilized in conjunction with the present embodiment of the invention, it is foreseen that the facility could be quite varied, such as a fixed film reactor or a reactor with a non-jet mixer or a fixed decanter, all within the scope of the present invention with the primary requirement being a contaminated water treatment facility requiring oxygen to be mixed with the water in order to decontaminate same.

The reservoir 6 has side walls 20, and a floor or bottom 22. Activated sludge that forms a sludge layer 23 when the reactor is in a settling, decanting or idle period is present in the reservoir 6 and settles on the bottom 22 when the wastewater reaction is not taking place. Some of the sludge is wasted on a regular basis to maintain a generally uniform sludge level 23. Wastewater to be treated 24 enters the reactor basin 4 through an influent pipe 26 controlled by flow regulating means, such as an automatic valve 28, in communication with a computer 29. The influent pipe 26 flow connects with the influent manifold 8 located near the bottom 22 of the reservoir 6.

A plurality of spaced distribution outlets or apertures 30 positioned and constructed to allow flow of wastewater 7 therethrough are located on the manifold 8 as shown in FIG. 2. The aperatures 30 may also be positioned to face toward the bottom 22 of the reservoir 6 so as to direct the flow of incoming or circulated wastewater 7 downward into sludge layer 23 settled therein. The manifold 8 and apertures 30 are designed and sized to distribute influent flow evenly across the reactor bottom 22. Wastewater flow or level sensor means, such as the illustrated level sensor 31, communicates with the computer 29 to automatically hold or divert wastewater flow to another reactor basin 4 when a filling reactor basin 4 becomes filled with wastewater 7.

The manifold 8 and influent pipe 26 also flow connect with the jet aeration/circulation conduit 12 and the recirculation pump 10. The jet aeration/circulation conduit 12 is located above the manifold 8 in the lower portion of the reservoir 6 and includes a plurality of cone shaped distribution outlets 32. A gas line 35 communicates with the conduit 12 at each distribution outlet 32. As shown in FIG. 3, each distribution outlet 32 includes an aperature 37 in the gas line 35 located at the bottom thereof that opens to a rounded jacket 40 surrounding the conduit 12 and extending to form an outer jet nozzle 43.

An aperature 46 in the conduit 12 opens in the same direction as the outer jet nozzle 43. An inner jet nozzle 49 located within the outer jet nozzle 43 is fixedly attached to the conduit 12, surrounds the aperature 46 and extends in the same direction as the outer nozzle 43. In the illustrated embodiment, the inner nozzle 49 and outer nozzle 43 are directed at a slightly downward angle with respect to horizontal and form mixing means having an internal venturi operably functioning as an eductor drawing oxygen rich gas from the gas line 35 when wastewater 7 is being expelled from the inner nozzle 49 mixing region 50 and with the remaining wastewater 7 in the basin 4 under turbulent flow conditions so as to optimize mixing of oxygen in the gas with the wastewater, such that preferably very little of the oxygen ejected by each jet nozzle 43 forms bubbles that rise to the top of the wastewater 7 and escape as off-gas. The outer nozzle 43 is sized to provide adequate area for the gas flowing around the jacket 40 to be entrained in the wastewater flowing from the inner nozzle 49. Preferably, the wastewater 7 mixes with the gas in the distribution outlets 32 such that the oxygen in the gas is substantially completely dissolved in or absorbed in the wastewater 7.

The gas line 35 is flow connected to a source of ambient air designated by the reference numeral 52 as shown in FIG. 4. The air flows through an air filter 58 and an air pipe 56 to a pump or air compressor 54. The air compressor 54 flow connects with a second air pipe 60 that communicates with an oxygen permeable membrane 62 located in a pressure containment enclosure 64. The membrane 62 may be in either sheet or tubular form and is made from any suitable permeable membrane of the type having pores sufficiently small to allow passage of oxygen, but to prevent the passage of nitrogen. The membrane can be constructed, for example, from a synthetic generally inert solid polymeric material.

The gas line 35 is flow connected to the membrane 62 such that oxygen rich gas passing through the oxygen permeable membrane 62 flows into the gas line 35. As used herein, the term "oxygen rich gas" means gas having a higher proportion of oxygen by both weight and volume than air. Preferably, the gas in the line 35 is close to 100% oxygen, although some minor components of other gasses may be present. The flow of oxygen rich gas is regulated by a throttle (not shown) automatically controlling the speed of the compressor 54. A valve 66 located on the gas line 35 and may be used to block flow of gas therethrough when no flow is desired. A nitrogen off-gas line 68 having a back pressure valve 70 is connected to the vacuum containment enclosure 64 and is utilized for the emission of nitrogen (as well as any other gasses separated from the oxygen rich stream passing through the membrane 62) therefrom.

The decanter 14, located in the upper portion of the reservoir 6 includes a solids excluding liquid receiver 80, flotation means, such as floats 82 and a flexible discharge conduit 84 passing through the reactor wall 20 and flowing to downstream equipment such as disinfection systems and/or final filters. The discharge conduit 84 has a variable volume control device illustrated by a control valve 86 positioned beneath the normal range of positions for the liquid receiver 80 to regulate the flow of fluid through the conduit 84. A detailed description of a suitable decanting apparatus that may be used for the process of this invention is disclosed in U.S. Pat. No. 4,645,592 which is incorporated herein by reference.

In operation, wastewater to be treated 24 enters through the influent pipe 26 and flows through the influent manifold 8 and out of the distribution outlets 30. The velocity of the influent is adjusted by valve 28. Initially, the wastewater 24 flows into a first of the reactors 3 typically under anoxic conditions or without aeration, although for certain operational modes, different conditions may exist during fill. Likewise, typically no pumps or power are normally used during the anoxic fill period.

Once the reservoir 6 is filled with wastewater 7, the fill period is completed, valve 28 is closed and influent flow of wastewater is held or diverted to the next reactor basin 4 in sequence. The wastewater 7 is circulated and then aerated during the react period. Wastewater 7 and microorganisms from the sludge layer 23 are drawn through the apertures 30 and through the manifold 8 and are circulated or pumped by pump 10 into the jet aeration/circulation conduit 12. The wastewater/sludge mixture is forced through inner nozzles 49 and outer nozzles 43 and into the reservoir 6. The discharge of the wastewater through the nozzles 49 and 43 creates a vacuum or region of reduced pressure as compared to the pressure of the surrounding wastewater 7, thereby further urging oxygen rich gas that may already be pressurized by the compresor 54 through the oxygen permeable membrane 62, the gas line 35 and jacket 40 into the outer nozzle 43.

In particular, a pressure gradient occurs between the pressurized air on the upstream side of the membrane 62 and the interior of the outer nozzle 43 which urges oxygen through the membrane 62, the gas line 35 and into the wastewater 7. This pressure gradient can be operationally varied by adjustment of the compressor 54, etc. and is generally proportional to the oxygen supply required for treatment of the water in the reservoir 6. A suitable range for the pressure gradient for many installations will be between about 1 and 15 pounds per square inch. As oxygen rich gas is drawn through the oxygen permeable membrane 62, nitrogen is expelled from the containment enclosure 64 through off-gas line 68. Back pressure in the contaminant enclosure 64 is preferably controlled by the automatic pressure regulatory valve 70. The oxygen rich gas flowing into the outer nozzle 43 is agitated or mixed with and then entrained in the wastewater 7 flowing out of nozzle 49 and the gas/liquid mixture flows out of the outer nozzle 43 forming a highly turbulent jet plume resulting in a high absorption rate of the oxygen into the wastewater 7 and availability of the oxygen to the microorganisms within the basin 4.

During the react period, organic contaminants and waste (that is, food for bacteria in the sludge) is generally completely degraded. Any off-gas from the process, including carbon dioxide and nitrogen are contained by the roof 16, vented to the filter 18 and then expelled into the atmosphere.

Aeration and mixing are then discontinued and the fluid in the reservoir 6 is allowed to settle. During the settle period, there is generally no internal movement or fluid flow inside the reservoir 6 and the treated, clarified water separates from the sludge with the microorganisms, with the sludge settling at the bottom of the reservoir 6 in the layer 23. Oxygen flow to the wastewater can be regulated by the flow of the recirculatin pump 10 which controls the strength of the eduction force on the oxygen flow and/or by throttling the compressor 54 which controls the driving force acting upon the oxygen upstream of the membrane 62.

The treated water is then ready to be decanted or discharged from the reservoir 6. The fluid is drawn into the receiver 80 and flows to downstream equipment such as disinfection systems and/or final filters. The flexible conduit 84 of the decanter 14 allows the liquid receiver 80 to lower, removing a desired portion of the treated water during the decant period. Alternative methods of operation allow water to be decanted from a fixed decanter while influent is added at the bottom of the reservoir 6 or the like.

A suitable semi-permeable membrane for use in separating oxygen and nitrogen in accordance with the present invention is disclosed in the Li et at. U.S. Pat. No. 4,663,050 which is incorporated herein by reference.

It is to be understood that while certain forms of the present invention have been illustrated and described herein, it is not to be limited to the specific forms or arrangement of parts described and shown.

What is claimed and desired to be secured by Letters Patent is as follows:

1. In a wastewater treatment apparatus including means for treating wastewater by biological and chemical processes and for mixing wastewater with oxygen, wherein said apparatus has a reaction vessel; the improvement comprising:
   (a) oxygen delivery means flow connecting an air source with an interior of said reaction vessel; said oxygen delivery means having an oxygen permeable membrane located in spaced relationship to wastewater within said reaction vessel;
   (b) means for supplying air to an upstream side of said membrane so as to provide a differential pressure across said membrane; and
   (c) conduit means flow connecting oxygen on a downstream side of the membrane with the interior of said reaction vessel.

2. The apparatus according to claim 1 including:
   (a) circulation means for circulating wastewater within said reaction vessel; and wherein
   (b) said conduit means flow connects with said circulation means.

3. The apparatus according to claim 2 including:
   (a) pumping means connected to the circulation means for circulating wastewater therethrough; and
   (b) oxygen-liquid mixing means located in the circulation means; said pumping means forcing wastewater through said mixing means so as to produce a pressure gradient urging the oxygen from said delivery means into said mixing means for mixing with the wastewater therein.

4. The apparatus according to claim 3 wherein said oxygen-liquid mixing means includes:
   (a) a chamber having at least one jet nozzle communicating with said mixing means; said nozzle having an outlet of smaller cross-section than a remainder portion thereof with wastewater flowing through said outlet and drawing oxygen through said remainder portion.

5. The apparatus according to claim 1 wherein;
(a) said permeable membrane is made from a synthetic inert solid polymeric material.

6. A wastewater treatment apparatus for treating wastewater by biological and chemical processes including mixing wastewater with oxygen; said apparatus including:
(a) a reactor vessel adapted to hold wastewater therein;
(b) an oxygen delivery pipe having first and second ends;
(c) an air source connected to said delivering pipe first end;
(d) an oxygen permeable membrane flow connected within said oxygen delivery pipe and located between said first and second ends;
(e) a wastewater circulation mechanism flow connected to said delivery pipe second end and located in said vessel;
(f) pumping means connected to said circulation mechanism and being adapted to pump wastewater through said circulation means and mix the wastewater with oxygen from said oxygen delivery pipe.

7. The apparatus according to claim 6 wherein said wastewater circulation mechanism includes:
(a) an oxygen-liquid mixing chamber having at least one jet nozzle communicating with said mixing chamber; said nozzle having an outlet of smaller cross-section than a remainder portion thereof with wastewater flowing through said outlet and operably functioning as an eductor for drawing oxygen through said remainder portion.

8. The apparatus according to claim 6 wherein:
(a) said oxygen permeable membrane is enclosed in a pressure containment enclosure having a vent adapted to expel nitrogen from said enclosure.

9. The apparatus according to claim 6 wherein:
(a) said permeable membrane is made from a synthetic inert solid polymeric material.

10. The apparatus according to claim 7 wherein:
(a) said permeable membrane is in the form of tubing.

11. The apparatus according to claim 9 wherein:
(a) said permeable membrane is in sheet form.

12. A wastewater treatment apparatus comprising means for treating wastewater by biological and chemical processes including mixing wastewater with oxygen; said apparatus including:
(a) a reactor vessel having upper and lower portions and adapted to hold wastewater therein;
(b) a wastewater inlet pipe selectively flow connected to said vessel to allow untreated wastewater to enter said vessel;
(c) a wastewater distribution channel flow connected to said wastewater inlet pipe and positioned in said vessel lower portion;
(d) a wastewater circulation and mixing conduit selectively communicating with said wastewater distribution channel;
(e) pumping means connected to said distribution channel and to said conduit;
(f) an air delivery pipe having first and second ends connected to an air source at said first end;
(g) an oxygen permeable membrane positioned at a location spaced from a wastewater receiving portion of said reactor vessel;
(h) a containment enclosure connected to said second end having said oxygen permeable membrane located therein;
(i) an oxygen delivery tube flow connected to said oxygen permeable membrane and communicating with said conduit; and
(j) a plurality of jet nozzles communicating with said conduit; said nozzles each having an outlet of smaller cross-section than a remainder portion thereof with wastewater pumped through said outlet by said pumping means and drawing oxygen from said oxygen delivery tube through said remainder portion.

13. The apparatus according to claim 12 including:
(a) a compressor flow connected with an air side of said membrane for compressing air to operably produce a pressure gradient across said membrane.

* * * * *